US010638393B2

(12) United States Patent
Moon et al.

(10) Patent No.: US 10,638,393 B2
(45) Date of Patent: *Apr. 28, 2020

(54) METHOD AND DEVICE FOR DETERMINING CONFIGURATION OF CONNECTION BETWEEN TERMINAL AND BASE STATION AND PERFORMING HANDOVER IN WIRELESS COMMUNICATION SYSTEM SUPPORTING DUAL CONNECTIVITY

(71) Applicant: Samsung Electronics Co., Ltd., Suwon-si, Gyeonggi-do (KR)

(72) Inventors: Jungmin Moon, Suwon-si (KR); Nigam Anshuman, Bangalore (IN); Jungsoo Jung, Seongnam-si (KR); Sunheui Ryoo, Yongin-si (KR); Sungjin Lee, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 75 days.

This patent is subject to a terminal disclaimer.

(21) Appl. No.: 15/110,900

(22) PCT Filed: Jan. 20, 2015

(86) PCT No.: PCT/KR2015/000548
§ 371 (c)(1),
(2) Date: Jul. 11, 2016

(87) PCT Pub. No.: WO2015/108391
PCT Pub. Date: Jul. 23, 2015

(65) Prior Publication Data
US 2016/0345231 A1 Nov. 24, 2016

(30) Foreign Application Priority Data

Jan. 20, 2014 (KR) .................. 10-2014-0006441

(51) Int. Cl.
*H04W 36/30* (2009.01)
*H04W 76/15* (2018.01)
(Continued)

(52) U.S. Cl.
CPC .......... *H04W 36/30* (2013.01); *H04B 17/318* (2015.01); *H04L 5/0035* (2013.01);
(Continued)

(58) Field of Classification Search
CPC ..... H04B 17/318; H04L 5/0032; H04L 43/16; H04L 5/0035; H04L 43/00; H04L 43/06;
(Continued)

(56) References Cited

U.S. PATENT DOCUMENTS

2011/0076960 A1 3/2011 Yun et al.
2012/0028665 A1 2/2012 Kwon et al.
(Continued)

FOREIGN PATENT DOCUMENTS

KR 10-2013-0010722 A 1/2013
KR 10-2013-0142274 A 12/2013
WO 2013/084723 A1 6/2013

OTHER PUBLICATIONS

Samsung, "Evaluation assumption for dual connectivity in scenario 2", R1-131020, 3GPP TSG RAN WG1 Meeting #72b, Apr. 15-19, 2013.*
(Continued)

*Primary Examiner* — Khoa Huynh
(74) *Attorney, Agent, or Firm* — Jefferson IP Law, LLP

(57) ABSTRACT

Provided are a method and apparatus for determining connection configuration between a user equipment (UE) and a base station (ENB) and performing handover in a wireless communication system supporting dual connectivity. The method of setting a connection configuration for a UE in a wireless communication system supporting dual connectiv-
(Continued)

ity may include: detecting occurrence of a handover event; selecting a macro ENB with the highest signal strength among neighboring macro ENBs and a small ENB with the highest signal strength among neighboring small ENBs; checking whether dynamic association is allowed in dual connectivity; and determining the connection configuration for the UE on the basis of the selected ENBs and checking result.

11 Claims, 16 Drawing Sheets

(51) Int. Cl.
H04W 36/00 (2009.01)
H04B 17/318 (2015.01)
H04L 5/00 (2006.01)
H04L 12/26 (2006.01)
H04W 36/08 (2009.01)
H04W 36/22 (2009.01)
H04W 36/32 (2009.01)
H04W 24/10 (2009.01)
H04W 36/04 (2009.01)

(52) U.S. Cl.
CPC ............ *H04L 43/16* (2013.01); *H04W 24/10* (2013.01); *H04W 36/0055* (2013.01); *H04W 36/0069* (2018.08); *H04W 36/04* (2013.01); *H04W 36/08* (2013.01); *H04W 36/22* (2013.01); *H04W 36/32* (2013.01); *H04W 76/15* (2018.02)

(58) Field of Classification Search
CPC .... H04L 43/062; H04W 18/18; H04W 36/04; H04W 76/025; H04W 24/10; H04W 36/0027; H04W 36/0055; H04W 36/08; H04W 36/22; H04W 36/30; H04W 36/32
See application file for complete search history.

(56) References Cited

U.S. PATENT DOCUMENTS

| | | |
|---|---|---|
| 2012/0039226 A1 | 2/2012 | Yang et al. |
| 2013/0034081 A1 | 2/2013 | Ban et al. |
| 2014/0349649 A1 | 11/2014 | Ganapathy et al. |
| 2015/0098452 A1* | 4/2015 | Dalsgaard ............ H04W 24/08 370/336 |
| 2015/0124708 A1* | 5/2015 | Blankenship ......... H04W 12/08 370/329 |
| 2015/0181473 A1* | 6/2015 | Horn ................. H04W 36/0027 370/331 |
| 2016/0029295 A1* | 1/2016 | Nagasaka ............ H04W 48/18 370/237 |
| 2016/0050706 A1* | 2/2016 | Zhang .................... H04W 4/70 370/280 |

OTHER PUBLICATIONS

Samsung, "Evaluation assumption for dual connectivity in scenario 2", R1-131020, 3GPP TSG RAN WG1 Meeting #72b, Apr. 15-19, 2013. (Year: 2013).*
Pedersen et al.; "Mobility enhancements for LTE-advanced multilayer networks with inter-site carrier aggregation"; IEEE Comminication Magazine, IEEE Service Center, Piscataway, US. vol. 51, No. 5, May 1, 2013, XP011520358.
Nsn et al.; "Autonomous SCell Managment for Dual Connecticity Cases";3GPP Draft; R2-132339; 3rd Generation Partnership Project (3GPP); Mobile Competence Centre; 650, Route Des Lucioles; F-06921 Spohia-Antipolis; vol. RAN WG2, Barcelona, Spain; Aug. 9, 2013; XP050718115.
Samsung; "Evaluation assumption for dual connectivity in scenario 2"; 3rd Generation Partnership Project (3GPP); Mobile Competence Centre; 650, Route Des Lucioles; F-06921 Spohia-Antipolis; vol. RAN WG1; Chicago, USA; Apr. 5, 2013; XP050696722.
Sharp; "Initial setup procedure for dual connectivity"; 3rd Generation Partnership Project (3GPP); Mobile Competence Centre; 650, Route Des Lucioles; F-06921 Spohia-Antipolis; vol. RAN WG2; Barcelona, Spain; Aug. 9, 2013; XP050718300.
Nokia Siemens Networks et al.; Mobility Statistics for Macro and Small Cell Dual-Connectivity Cases; 3GPP TSG-RAN WG2 Meeting #81bis; R2-131056; Apr. 15-19, 2013; Chicago, IL.
Korean Office Action with English translation dated Jan. 21, 2020; Korean Appln. No.10-2014-0006441.

* cited by examiner

METHOD AND DEVICE FOR DETERMINING CONFIGURATION OF CONNECTION BETWEEN TERMINAL AND BASE STATION AND PERFORMING HANDOVER IN WIRELESS COMMUNICATION SYSTEM SUPPORTING DUAL CONNECTIVITY

TECHNICAL FIELD

The present invention relates to a wireless communication system and, more particularly, to a method and apparatus for determining connection configuration between a user equipment and a base station and performing handover in a wireless communication system supporting dual connectivity.

BACKGROUND ART

In general, mobile communication systems have been developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

Meanwhile, dual connectivity enables a user equipment (UE) to connect to two different base stations (ENBs) and to receive services therefrom at the same time. For example, a dual connectivity enabled UE may connect to macro and small ENBs having different functions and receive services therefrom.

Standardization bodies for communication are currently active to investigate various technologies for dual connectivity. In particular, it is crucially necessary to develop a scheme for determining connection configuration between UE and ENB and for handling handover.

DISCLOSURE OF INVENTION

Technical Problem

The present invention has been made in view of the above problems. Accordingly, an aspect of the present invention is to provide a method and apparatus for determining connection configuration between a user equipment (UE) and a base station (BS or ENB) and handling handover in a wireless communication system supporting dual connectivity.

More specifically, an aspect of the present invention is to provide a scheme that enables a UE having discovered a new ENB to determine whether to have single connectivity or dual connectivity, whether to maintain single or dual connectivity to a particular ENB, the point in time for connection switching, and information needed for connection switching.

Solution to Problem

In accordance with an aspect of the present invention, there is provided a method of setting a connection configuration for a user equipment (UE) in a wireless communication system supporting dual connectivity. The method may include: detecting occurrence of a handover event; selecting a macro base station (macro ENB) with the highest signal strength among neighboring macro ENBs and a small base station (small ENB) with the highest signal strength among neighboring small ENBs; checking whether dynamic association is allowed in dual connectivity; and determining the connection configuration for the UE on the basis of the selected ENBs and checking result.

In accordance with another aspect of the present invention, there is provided a method of setting a connection configuration for a base station (ENB) in a wireless communication system supporting dual connectivity. The method may include: receiving a measurement report from a user equipment (UE) wherein the measurement report contains results of measurement performed by the UE on a macro ENB and a small ENB; determining the connection configuration for the UE on the basis of the measurement report; and sending the determined connection configuration to the UE.

In accordance with another aspect of the present invention, there is provided a user equipment (UE) capable of setting a connection configuration in a wireless communication system supporting dual connectivity. The user equipment may include: a transceiver unit to send and receive signals to and from a base station (ENB); and a control unit to control a process of selecting, upon detecting a handover event, a macro ENB with the highest signal strength and a small ENB with the highest signal strength, checking whether dynamic association is allowed in dual connectivity, and determining the connection configuration for the UE on the basis of the selected ENBs and checking result.

In accordance with another aspect of the present invention, there is provided a base station (ENB) capable of setting a connection configuration for a user equipment (UE) in a wireless communication system supporting dual connectivity. The base station may include: a transceiver unit to send and receive a signal to and from the UE; and a control unit to control a process of receiving a measurement report containing results of measurement performed by the UE on a macro ENB and a small ENB from the UE, determining the connection configuration for the UE on the basis of the measurement report, and sending the determined connection configuration to the UE.

Advantageous Effects of Invention

In a feature of the present invention, it is possible to make best use of dual connectivity while minimizing switching between single connectivity mode and dual connectivity mode. Thereby, the user equipment may remain in dual connectivity mode for an extended time.

MODE FOR THE INVENTION

Figure 1:
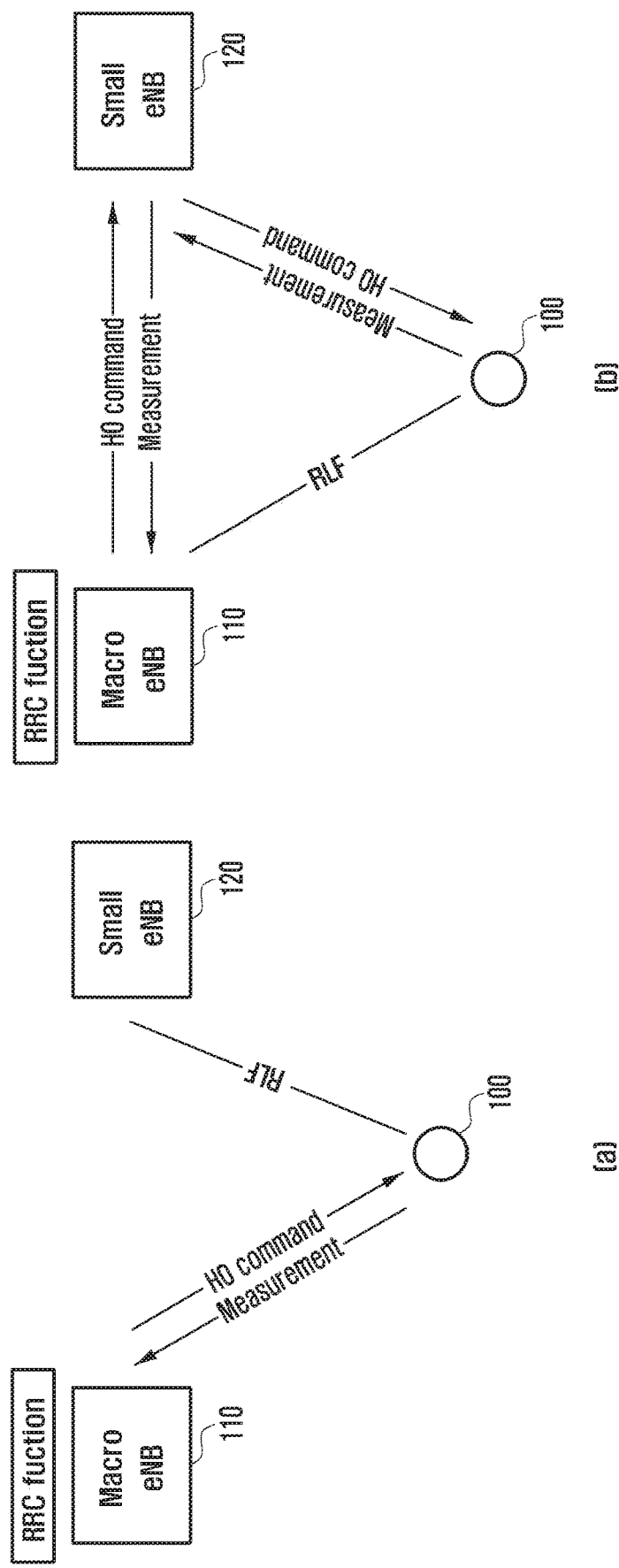
FIG. 1 illustrates advantages of using dual connectivity in handover according to an embodiment of the present invention.

Hereinafter, preferred embodiments of the present invention are described in detail with reference to the accompanying drawings. The same or similar reference symbols are used throughout the drawings to refer to the same or like parts. Descriptions of well-known functions and constructions may be omitted for clarity and conciseness.

Descriptions of well-known functions and structures incorporated herein may be omitted to avoid obscuring the subject matter of the present invention. Descriptions of components having substantially the same configurations and functions may also be omitted.

In the drawings, some elements are exaggerated, omitted, or only outlined in brief, and thus may be not drawn to scale. The present invention is not limited by the relative sizes of objects and intervals between objects in the drawings.

The aspects, features and advantages of certain embodiments of the present invention will be more apparent from the following detailed description taken in conjunction with the accompanying drawings. The description of the various embodiments is to be construed as exemplary only and does not describe every possible instance of the present invention. It should be apparent to those skilled in the art that the following description of various embodiments of the present invention is provided for illustration purpose only and not for the purpose of limiting the present invention as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

As described before, dual connectivity is one of various technologies being under active investigation. Some techniques for coordinated transmission and reception have already been proposed. Coordinated multi-point transmission and reception (CoMP) is a representative example.

While ENBs having the same functions cooperate to support a UE in CoMP, macro and small ENBs having different functions cooperate to support a UE in dual connectivity.

This difference causes new problems to be solved.

Embodiments of the present invention to be described below propose a scheme for determining a connection configuration between UE and ENBs and a scheme for handling handover in a mobile communication system supporting dual connectivity.

More specifically, a description is given of a scheme that enables a UE having discovered a new ENB to determine whether to use single connectivity or dual connectivity, which ENB the UE should maintain single or dual connectivity to, the point in time for connection switching, and information needed for connection switching. In addition, a description is given of a scheme that enables a mobile communication system scheduled to employ dual connectivity to effectively support UE mobility.

Hereinafter, the scheme of the present invention for determining a connection configuration in dual connectivity and for handover is described in the following order.
- (a) Background: dual connectivity and handover
- (b) Proposed scheme
  - <b1> Determining connection configuration in dual connectivity
  - <b2> Triggering handover in dual connectivity
  - <b3> Information provided for proposed scheme
- (c) Summary
- (a) Background: Dual Connectivity and Handover As described before, dual connectivity enables a UE to simultaneously connect to macro and small ENBs to receive services therefrom. Here, the macro ENB and small ENB have differences not only in cell coverage (or radius of service) but also in function. Specifically, for a UE having dual connectivity to a macro ENB and small ENB at the same time, a Radio Resource Control (RRC) message may be sent only to the macro ENB. The small ENB is not allowed to directly send an RRC message to the UE having dual connectivity, but can play a part in RRC message transmission through information exchange with the macro ENB. In other words, the macro ENB is responsible for the RRC function of a UE having dual connectivity.

For reference, RRC functions are described in Table 1.

TABLE 1

Broadcast of System Information related to the non-access stratum (NAS)
Broadcast of System Information related to the access stratum (AS)
Paging
Establishment, maintenance and release of an RRC connection between UE and E-UTRAN
Security functions including key management
Establishment, configuration, maintenance and release of point to point radio bearers
Mobility functions
QoS management functions
UE measurement reporting and control of reporting
Direct NAS message transfer to/from NAS from/to UE A UE having dual connectivity may have the following advantages in handover. These advantages are described with reference to FIG. 1.

FIG. 1 illustrates advantages of using dual connectivity in handover according to an embodiment of the present invention.

The advantage is described first with reference to part (a) of FIG. 1.

First, as the macro ENB 110 is responsible for RRC message transfer to and from the UE 100, radio link failure (RLF) occurring at the link between the UE 100 and small ENB 120 does not cause trouble to RRC message transfer of the UE 100.

The advantage is described further with reference to part (b) of FIG. 1.

Second, when an RLF occurs at the link between the UE 100 and macro ENB 110, RRC messages may be transferred to and from the UE 100 through the relayed link (UE 100—small ENB 120—macro ENB 110). That is, RLF occurring at the link between the UE and macro ENB may delay RRC message transmission owing to the relayed link but does not cause a failure in RRC message transmission.

As described above, the UE 100 having dual connectivity may stably send and receive RRC messages. Hence, it is possible to significantly reduce the possibility of handover failure due to the loss of handover-related RRC messages.

To make good use of dual connectivity, it is necessary for the UE to select one or more serving cells in consideration of multiple ENBs at the same time. This is described with reference to FIG. 2.

Figure 2:
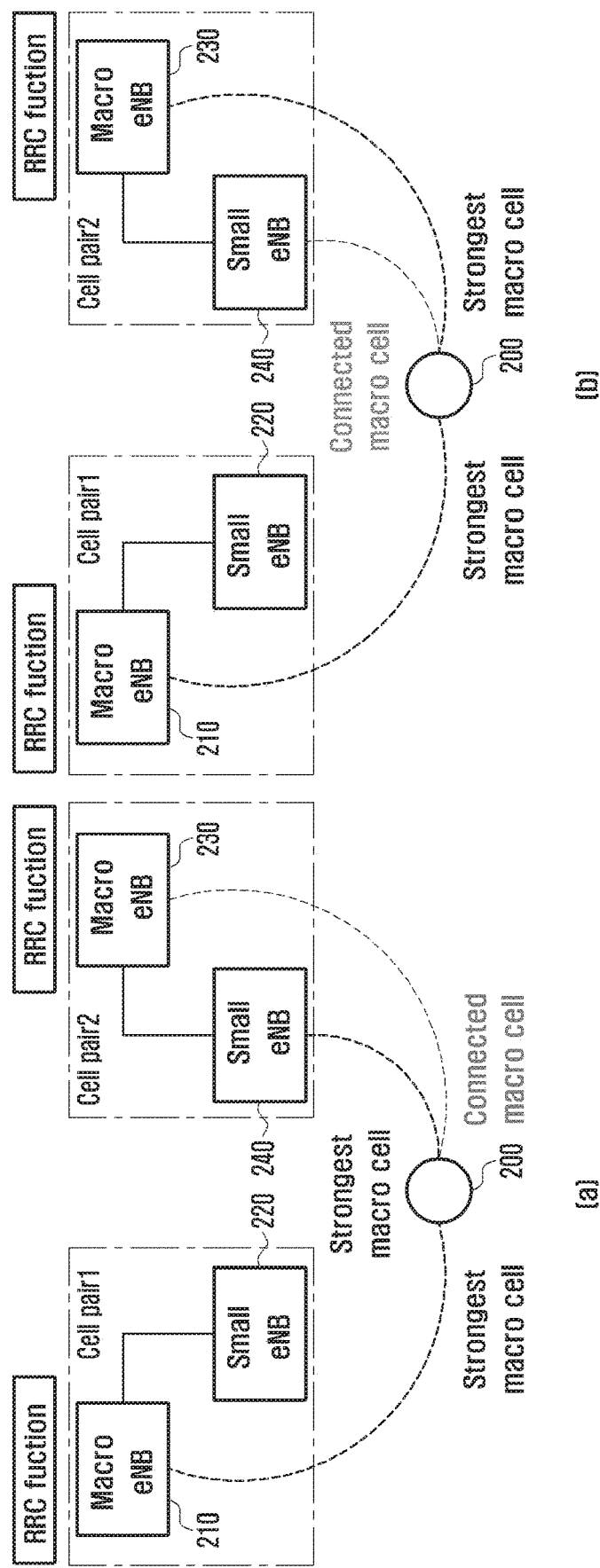
FIG. 2 illustrates a situation where a UE selects a serving cell in consideration of multiple ENBs at the same time according to an embodiment of the present invention.

FIG. 2 illustrates a situation where the UE selects a serving cell in consideration of multiple ENBs at the same time according to an embodiment of the present invention.

As shown in parts (a) and (b) of FIG. 2, it is assumed that the macro ENB 210 and small ENB 220 belonging to cell pair 1 is interconnected via a backhaul link and the macro ENB 230 and small ENB 240 belonging to cell pair 2 is interconnected. Each cell pair is assumed to enable the UE 200 to have dual connectivity. In other words, in one embodiment, a cell pair may be formed of a macro ENB and small ENB that enable one UE to have dual connectivity.

It is also assumed that ENBs belonging to different cell pairs does not enable one UE to have dual connectivity owing to backhaul delay or the like because the ENBs are not interconnected or are interconnected via a link with two or more hops.

Under the above assumptions, a description is given of the situation shown in part (a) of FIG. 2.

Part (a) of FIG. 2 depicts a situation where the UE 200 has discovered a macro ENB of cell pair 1 with the highest signal strength/quality and a small ENB of cell pair 2 with the highest signal strength/quality.

If the UE 200 is of low mobility and is sending and receiving high-speed data, it may prefer receiving a service from a small ENB to receiving a service from a macro ENB. Hence, the UE 200 may attempt to connect to the small ENB 240 belonging to cell pair 2.

In this case, to obtain gains due to dual connectivity, it may be preferable for the UE 200 to connect to the macro ENB 230 of cell pair 2 rather than the macro ENB 210 of cell pair 1 with the highest signal strength/quality.

Next, a description is given of the situation shown in part (b) of FIG. 2.

Part (b) of FIG. 2 depicts a situation where the UE 200 has discovered a small ENB 220 of cell pair 1 with the highest signal strength/quality and a macro ENB 230 of cell pair 2 with the highest signal strength/quality.

If the UE 200 is of high mobility and is sending and receiving a small amount of data, it may prefer receiving a service from a macro ENB to receiving a service from a small ENB. Hence, the UE 200 may attempt to connect to the macro ENB 230 belonging to cell pair 2.

In this case, to obtain gains due to dual connectivity, it may be preferable for the UE 200 to connect to the small ENB 240 of cell pair 2 rather than the small ENB 220 of cell pair 1 with the highest signal strength/quality.

This phenomenon is caused by the difference between roles of the macro ENB and small ENB. That is, as the macro ENB is responsible for the RRC function of a UE having dual connectivity, to obtain RRC diversity gains due to dual connectivity, it sometimes happens that the UE is not connected to the ENB with the highest signal strength/quality.

In the existing system supporting single connectivity only, handover is generally carried out so that the UE is connected to the ENB with the highest signal strength/quality. However, in a system supporting dual connectivity as described above, the signal strength/quality may alone be insufficient as the criterion for handover.

To address such a problem caused by dual connectivity, in the present invention, a description is given of a scheme for determining the connection configuration and performing handover in the case of dual connectivity.

(b) Proposed Scheme

<b1> Determining Connection Configuration in Dual Connectivity

Figure 3:
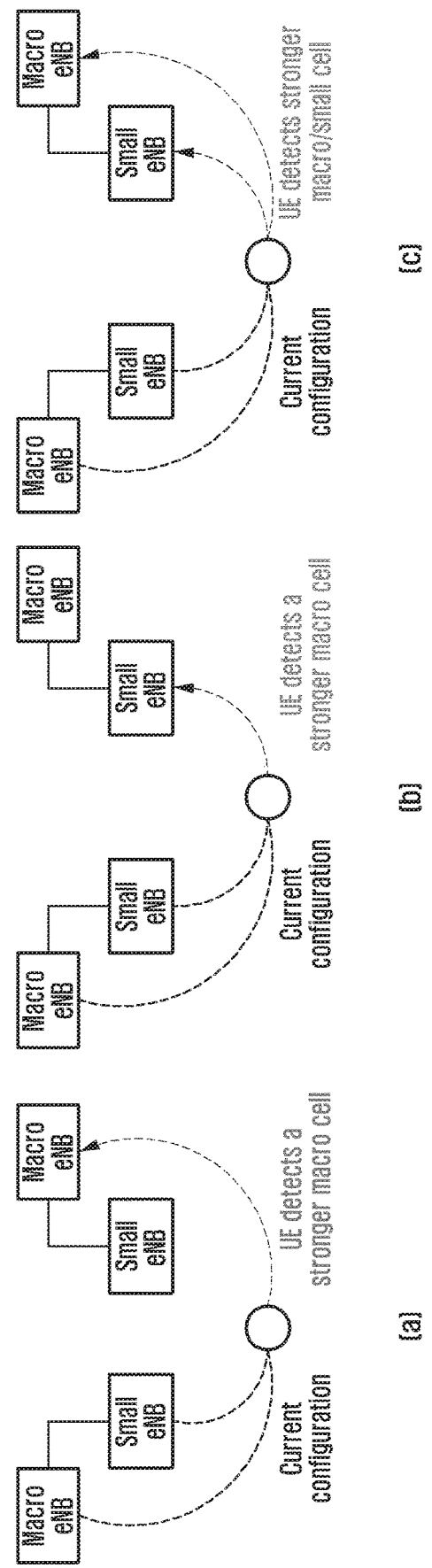
FIG. 3 illustrates a situation where a dual connectivity enabled UE searches for a new ENB in the vicinity according to an embodiment of the present invention.

FIG. 3 illustrates a situation where a dual connectivity enabled UE searches for a new ENB in the vicinity according to an embodiment of the present invention.

The UE may discover a new ENB in three situations depicted respectively in parts (a), (b) and (c) of FIG. 3.

Part (a) of FIG. 3 illustrates a situation where the UE discovers a macro ENB with higher signal strength/quality than the current macro ENB (cell).

Part (b) of FIG. 3 illustrates a situation where the UE discovers a small ENB with higher signal strength/quality than the current small ENB.

Part (c) of FIG. 3 illustrates a situation where the UE discovers a macro ENB and small ENB with higher signal strength/quality than the current macro ENB and small ENB.

Next, a description is given of connection configurations available in each of the situations depicted in parts (a), (b) and (c) of FIG. 3.

Figure 4:
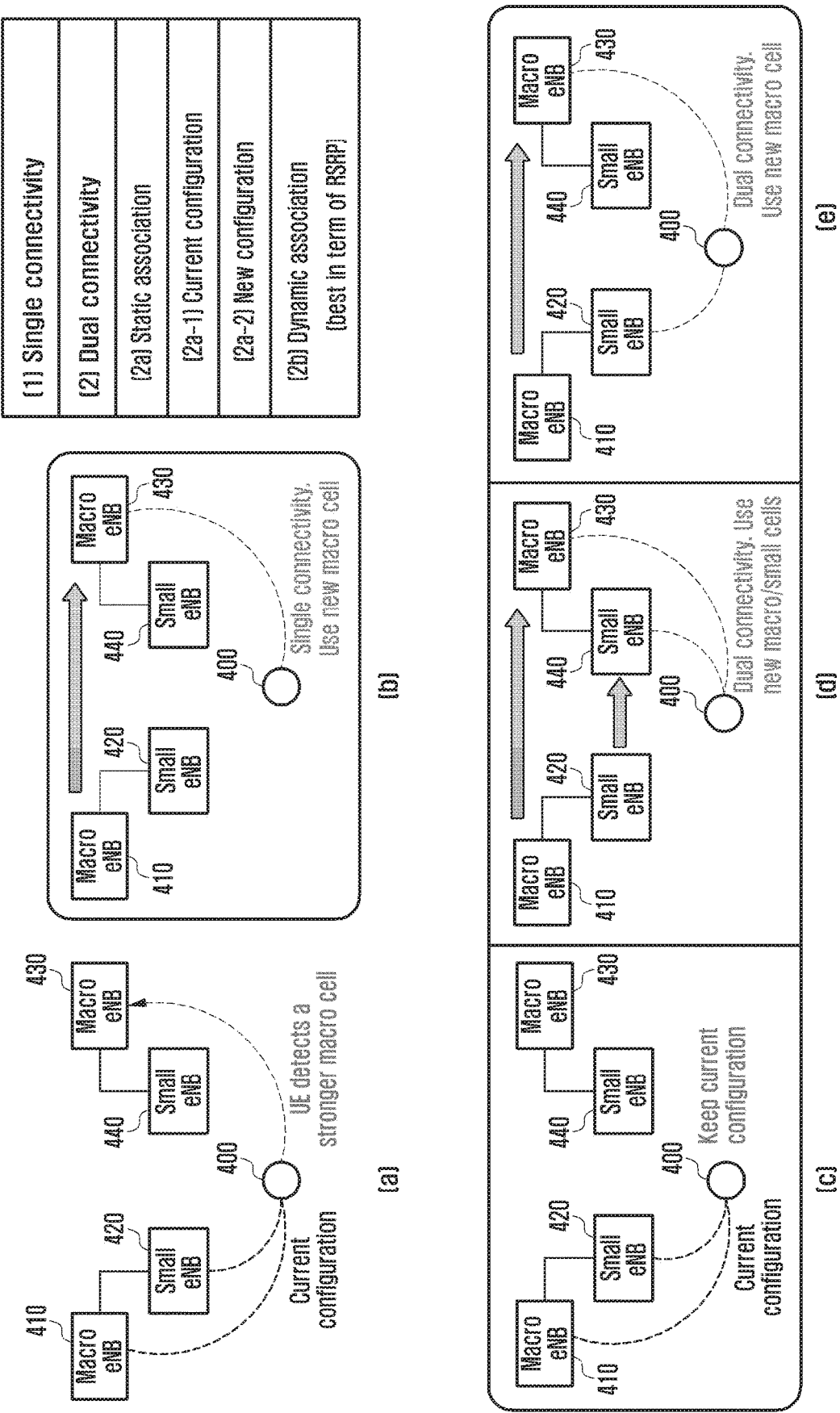
FIG. 4 illustrates types of connection configurations selectable by the UE upon discovery of a macro ENB with higher signal strength/quality than the current macro ENB (cell) according to an embodiment of the present invention.

First, a description is given of the situation where the UE discovers a macro ENB with higher signal strength/quality than the current macro ENB (macro cell) with reference to FIG. 4.

FIG. 4 illustrates types of connection configurations selectable by the UE upon discovery of a macro ENB with higher signal strength/quality than the current macro ENB (cell) according to an embodiment of the present invention.

The UE 400 may discover a macro ENB 430 with higher signal strength/quality than the current macro ENB 410 as shown in part (a) of FIG. 4. In this case, the UE 400 may make a connection according to one of the following ways.

As shown in part (b) of FIG. 4, the UE 400 may determine to have single connectivity. Here, the UE 400 may make a single connection to the newly discovered macro ENB 430.

Part (b) of FIG. 4 may correspond to a case where it is not necessary to maintain dual connections because the newly discovered macro ENB 430 has an excellent signal strength/quality, or to a case where the connection to a small ENB is not needed owing to high UE mobility.

As shown in part (c) of FIG. 4, the UE 400 may determine to maintain the current connection configuration in consideration of dual connectivity and static association. That is, the UE 400 may maintain dual connectivity to the macro ENB 410 and small ENB 420 belonging to cell pair 1.

Part (c) of FIG. 4 may correspond to a case where the good signal quality of the newly discovered macro ENB 430 is not very useful because the UE 400 receives a service mainly from the current small ENB 420.

As shown in part (d) of FIG. 4, the UE 400 may determine to set a new connection configuration in consideration of dual connectivity and static association. To utilize the newly discovered macro ENB 430, the UE 400 may have new dual connectivity by connecting to the macro ENB 430 and small ENB 440 belonging to cell pair 2.

Part (d) of FIG. 4 may correspond to a case where the UE 400 prefers to connect to the newly discovered macro ENB 430 so as to obtain RRC diversity gains due to dual connectivity although the small ENB 420 has a higher signal strength/quality than the other small ENBs. Here, it is necessary to make dual connections to the macro ENB 430 and small ENB 440 belonging to the same cell pair (i.e. cell pair 2).

As shown in part (e) of FIG. 4, the UE 400 may determine to set a new connection configuration in consideration of dual connectivity and dynamic association. When dynamic association is allowed, the UE 400 may have new dual connectivity by conducting connection switching from the macro ENB 410 to the macro ENB 430 of cell pair 2 and maintaining the connection to the small ENB 420 of cell pair 1.

This dynamic association may be most desirable in terms of signal strength/quality between UE and macro/small ENB, but it requires low-delay communication between ENBs belonging to different cell pairs through the wired/wireless backhaul.

Figure 5:
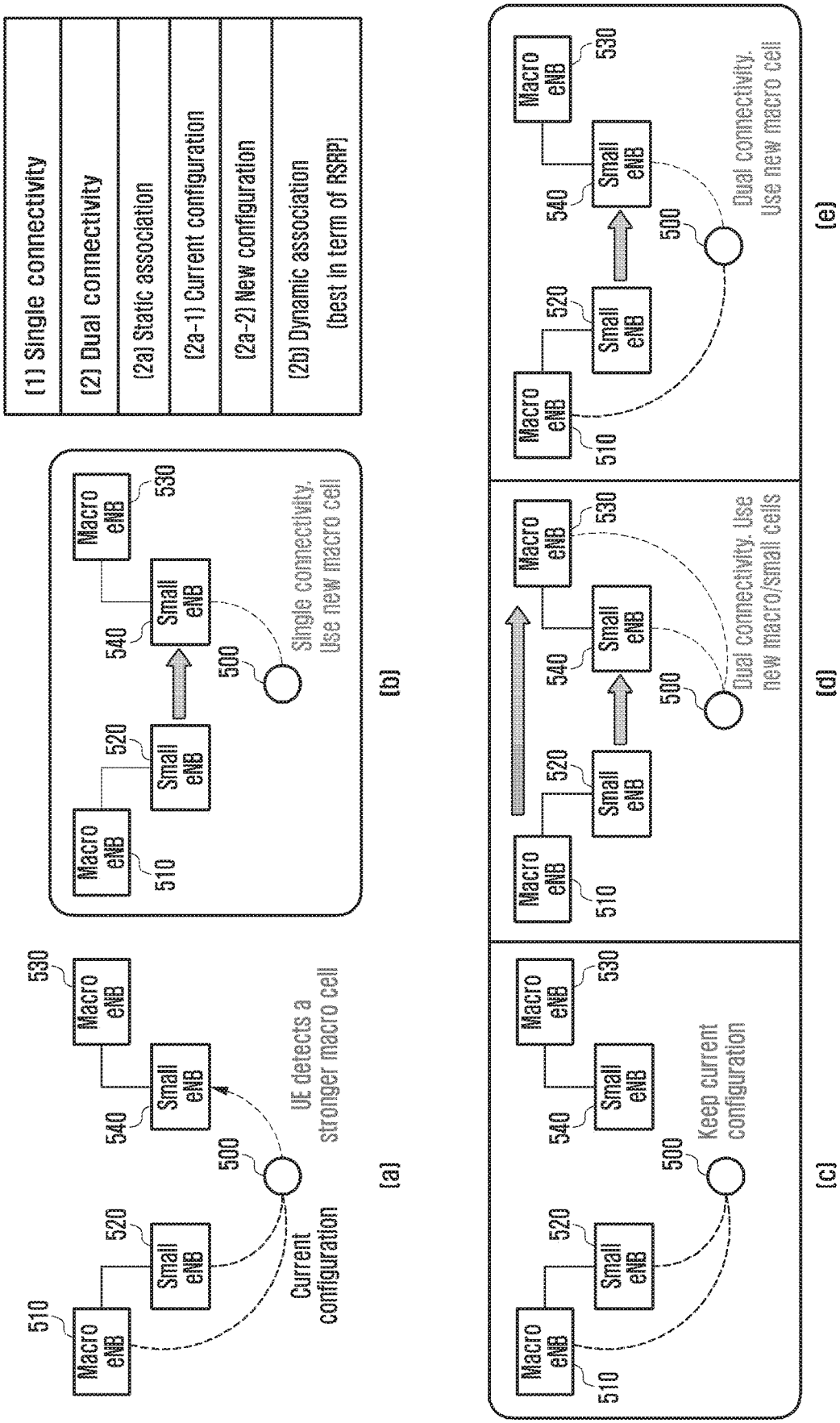
FIG. 5 illustrates types of connection configurations selectable by the UE upon discovery of a small ENB with higher signal strength/quality than the current small ENB according to an embodiment of the present invention.

FIG. 5 illustrates types of connection configurations selectable by the UE upon discovery of a small ENB with higher signal strength/quality than the current small ENB according to an embodiment of the present invention.

The UE 500 may discover a small ENB 530 with higher signal strength/quality than the current small ENB 520 as shown in part (a) of FIG. 5. In this case, the UE 500 may make a connection according to one of the following ways.

As shown in part (b) of FIG. 5, the UE 500 may make a single connection to the newly discovered small ENB 540. This may correspond to a case where it is not necessary to maintain dual connections because the newly discovered small ENB 540 has an excellent signal strength/quality, or to a case where the connection to a macro ENB is not needed owing to low UE mobility or offloading of the macro ENB.

As shown in part (c) of FIG. 5, the UE 500 may maintain the current connection configuration in consideration of dual connectivity and static association. That is, the UE 500 may maintain dual connectivity to the macro ENB 510 and small ENB 520 belonging to current cell pair 1. This may correspond to a case where the good signal quality of the newly discovered small ENB 540 is not very useful because the UE 500 receives a service mainly from the current macro ENB 510.

As shown in part (d) of FIG. 5, the UE 500 may set a new connection configuration in consideration of dual connectivity and static association. That is, the UE 500 may have new dual connectivity by connecting to the macro ENB 530 and small ENB 540 belonging to cell pair 2.

This may correspond to a case where the UE 500 prefers to connect to the newly discovered small ENB 540 so as to obtain RRC diversity gains due to dual connectivity although the macro ENB 510 has a higher signal strength/quality than the macro ENB 530. Here, it is necessary to make dual connections to the macro ENB and small ENB belonging to the same cell pair (i.e. cell pair 2).

As shown in part (e) of FIG. 5, the UE 400 may set a new connection configuration in consideration of dual connectivity and dynamic association. That is, the UE 500 may have new dual connectivity by conducting connection switching to the small ENB 540 of cell pair 2 and maintaining the connection to the macro ENB 510 of cell pair 1.

This dynamic association may be most desirable in terms of signal strength/quality between UE and macro/small ENB, but it requires low-delay communication between ENBs belonging to different cell pairs through the wired/wireless backhaul.

Figure 6:
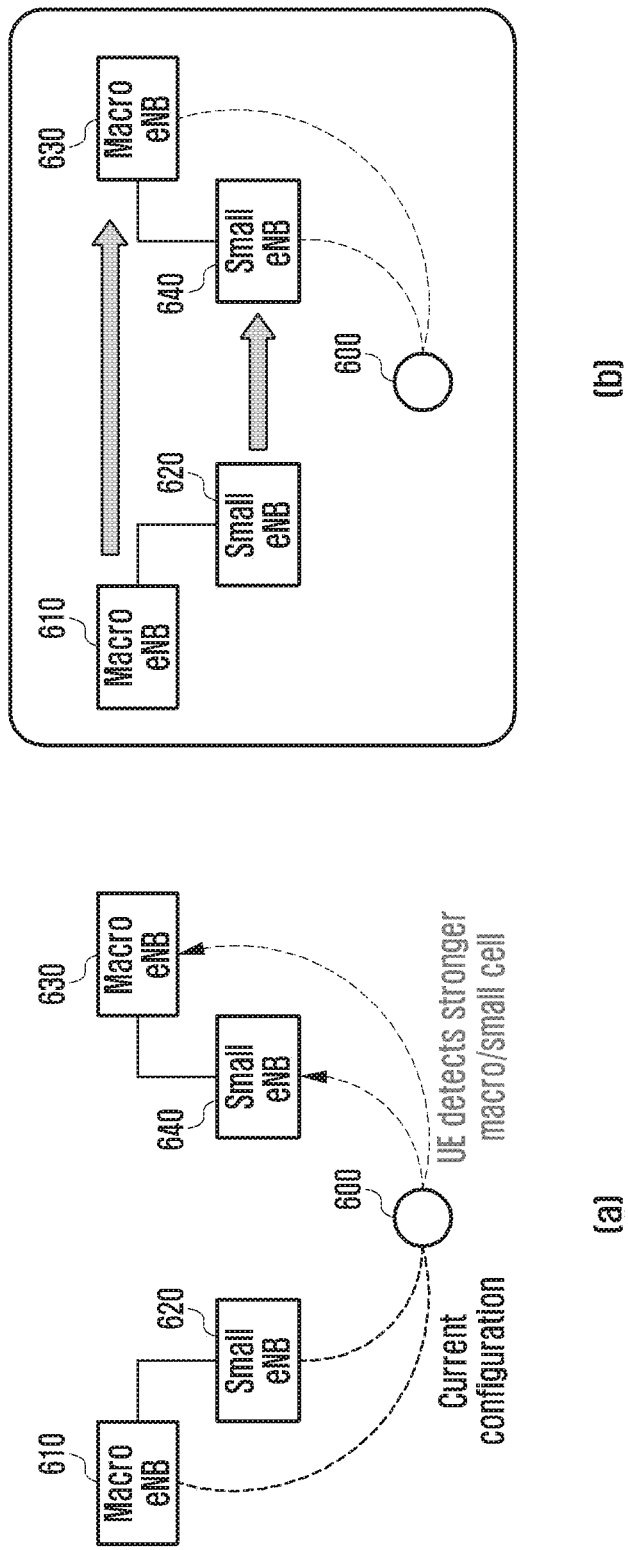
FIG. 6 illustrates types of connection configurations selectable by the UE upon discovery of macro and small ENBs with higher signal strength/quality than the current macro and small ENBs according to an embodiment of the present invention.

FIG. 6 illustrates types of connection configurations selectable by the UE upon discovery of macro and small ENBs with higher signal strength/quality than the current macro and small ENBs according to an embodiment of the present invention.

As shown in part (a) of FIG. 6, the UE 600 may discover a macro ENB 630 and small ENB 640 with higher signal strength/quality than the current macro ENB 610 and small ENB 620.

In this case, as shown in part (b) of FIG. 6, the UE 500 may set a new connection configuration to utilize the newly discovered macro and small ENBs in consideration of dual connectivity and static association. That is, the UE 500 may have new dual connectivity by connecting to the macro ENB 630 and small ENB 640 belonging to cell pair 2.

Hereinabove, a description is given of types of connection configurations available when a dual connectivity enabled UE discovers a new macro ENB or new small ENB with reference to FIGS. 4 to 6.

In the existing system supporting single connectivity only, the UE has only to select one ENB with the highest signal strength/quality and does not have to consider a suitable connection configuration. However, in a system supporting dual connectivity according to the present invention, as various connection configurations are possible, the UE has to select one of the connection configurations.

Figure 7:
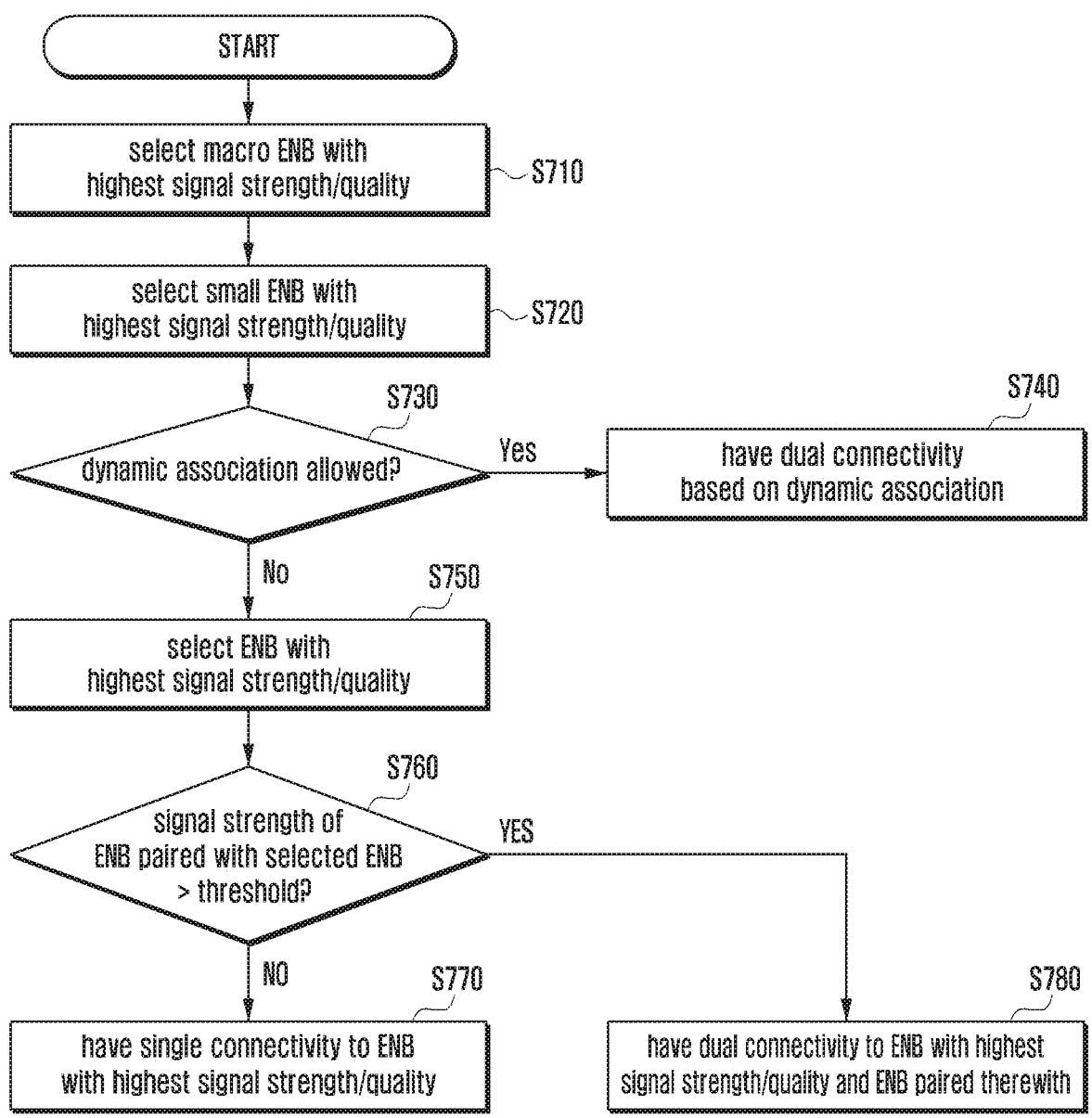
FIG. 7 is a flowchart of a procedure for the UE to determine a connection configuration according to an embodiment of the present invention.

To address the above issue, a description is given of a scheme of the present invention for determining the connection configuration with reference to a flowchart of FIG. 7.

FIG. 7 is a flowchart of a procedure for the UE to determine a connection configuration according to an embodiment of the present invention.

At step S710, the UE selects a macro ENB with the highest signal strength/quality among neighboring macro ENBs. At step S720, the UE selects a small ENB with the highest signal strength/quality among neighboring small ENBs.

At step S730, the UE determines whether dynamic association is allowed.

Dynamic association may refer to a mechanism that permits the UE to have dual connectivity to a macro ENB and small ENB belonging to different cell pairs. For example, when dynamic association is allowed, the UE may connect to a macro ENB of a first cell pair and a small ENB of a second cell pair. Likewise, when dynamic association is allowed, the UE may connect to a small ENB of the first cell pair and a macro ENB of the second cell pair.

Whether dynamic association is allowed can be identified in various ways. For example, the network may send the UE a separate signal indicating whether dynamic association is allowed. The network may transmit system information containing information indicating whether dynamic association is allowed.

Alternatively, the UE may send the network a separate query about whether dynamic association is allowed. In response to the query, the network may send the UE a message indicating whether dynamic association is allowed.

If dynamic association is allowed, at step S740, the UE makes dual connections to the macro ENB selected at step S710 and the small ENB selected at step S720.

If dynamic association is not allowed, at step S750, the UE selects the ENB with the highest signal strength/quality. Here, the UE may select one of the macro ENB selected at step S710 and the small ENB selected at step S720 having a higher signal strength/quality.

At step S760, the UE identifies the ENB paired with the selected ENB and checks whether the ENB paired with the selected ENB has a signal strength/quality higher than or equal to a preset threshold.

If the paired ENB has a signal strength/quality higher than or equal to the preset threshold, at step S780, the UE makes dual connections to the ENB with the highest signal strength/quality (best ENB) and the ENB paired therewith.

If the paired ENB has a signal strength/quality lower than or equal to the preset threshold, at step S770, the UE makes a single connection to the ENB with the highest signal strength/quality (best ENB).

The UE may select one connection configuration among multiple possible connection configurations according to the above procedure.

In another embodiment of the present invention, the following issue may be further applied in consideration of characteristics of the macro ENB and small ENB.

Specifically, it is desirable for a high-mobility UE to connect to a macro ENB having a wide coverage. Hence, in this case, the UE may be forced to select a macro ENB as the best ENB (at step S750).

Figure 8:
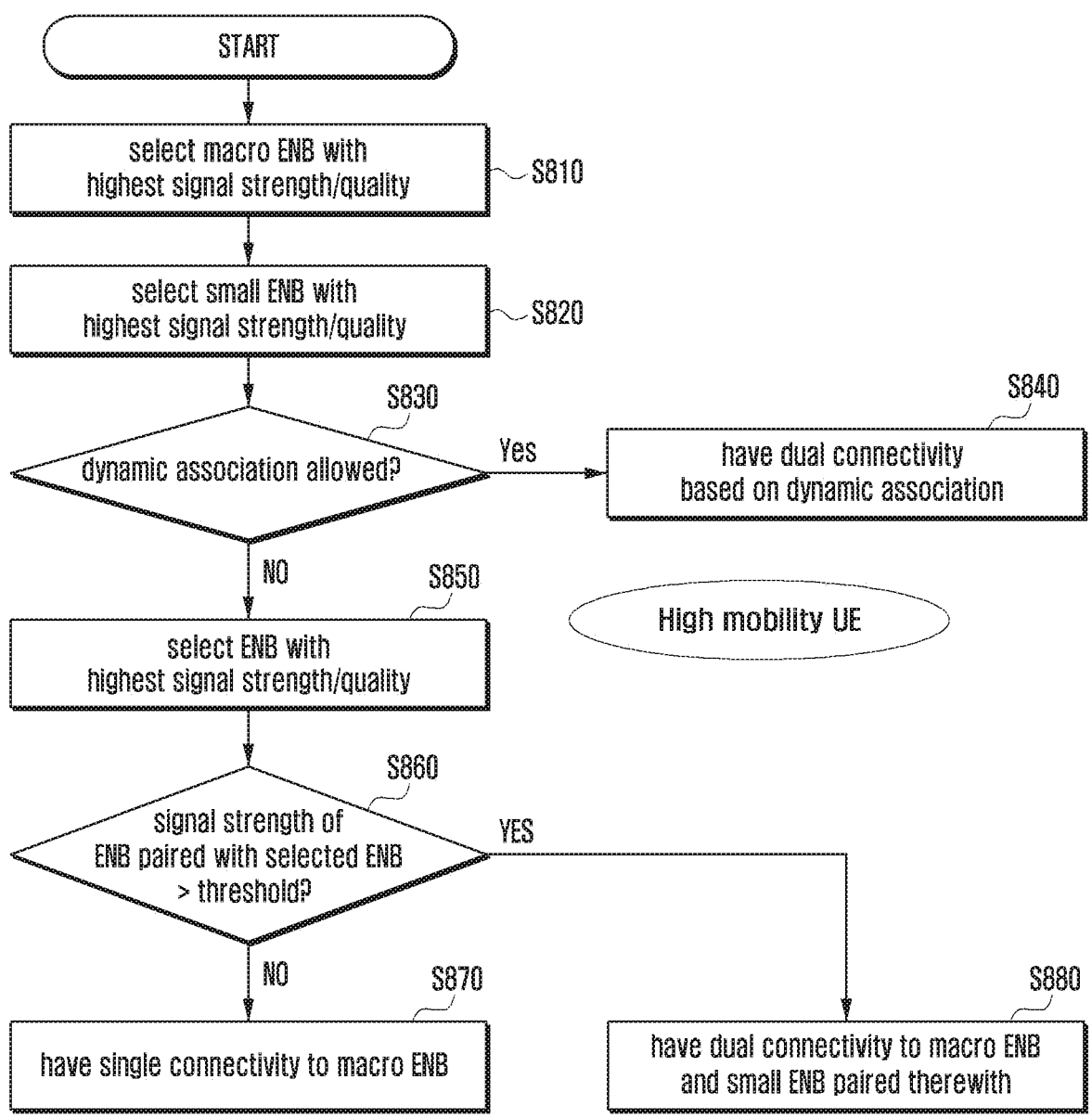
FIG. 8 is a flowchart of a procedure for the UE to determine a connection configuration according to another embodiment of the present invention.

This embodiment is described in FIG. 8.

FIG. 8 is a flowchart of a procedure for the UE to determine a connection configuration according to another embodiment of the present invention. More specifically, in FIG. 8, it is assumed that the UE is of high mobility.

At step S810, the UE selects a macro ENB with the highest signal strength/quality among neighboring macro ENBs. At step S820, the UE selects a small ENB with the highest signal strength/quality among neighboring small ENBs.

At step S830, the UE determines whether dynamic association is allowed.

If dynamic association is allowed, at step S840, the UE makes dual connections to the macro ENB selected at step S810 and the small ENB selected at step S820.

If dynamic association is not allowed, at step S850, the UE selects the macro ENB selected at step S810. This is because the UE is of high mobility.

At step S860, the UE identifies the ENB paired with the selected ENB and checks whether the ENB paired with the selected ENB has a signal strength/quality higher than or equal to a preset threshold.

If the paired ENB has a signal strength/quality higher than or equal to the preset threshold, at step S880, the UE makes dual connections to the selected macro ENB and the ENB paired therewith.

If the paired ENB has a signal strength/quality lower than or equal to the preset threshold, at step S870, the UE makes a single connection to the selected macro ENB (macro ENB with the highest signal strength/quality).

In addition to UE mobility, the connection configuration may be determined in consideration of the data rate or offloading. When a UE is of low mobility and requires a high data rate, it is desirable for the UE to connect to a small ENB for offloading of the macro ENB.

Hence, in this case, the UE may be forced to select a small ENB as the best ENB (at step S750 in FIG. 7).

Figure 9:
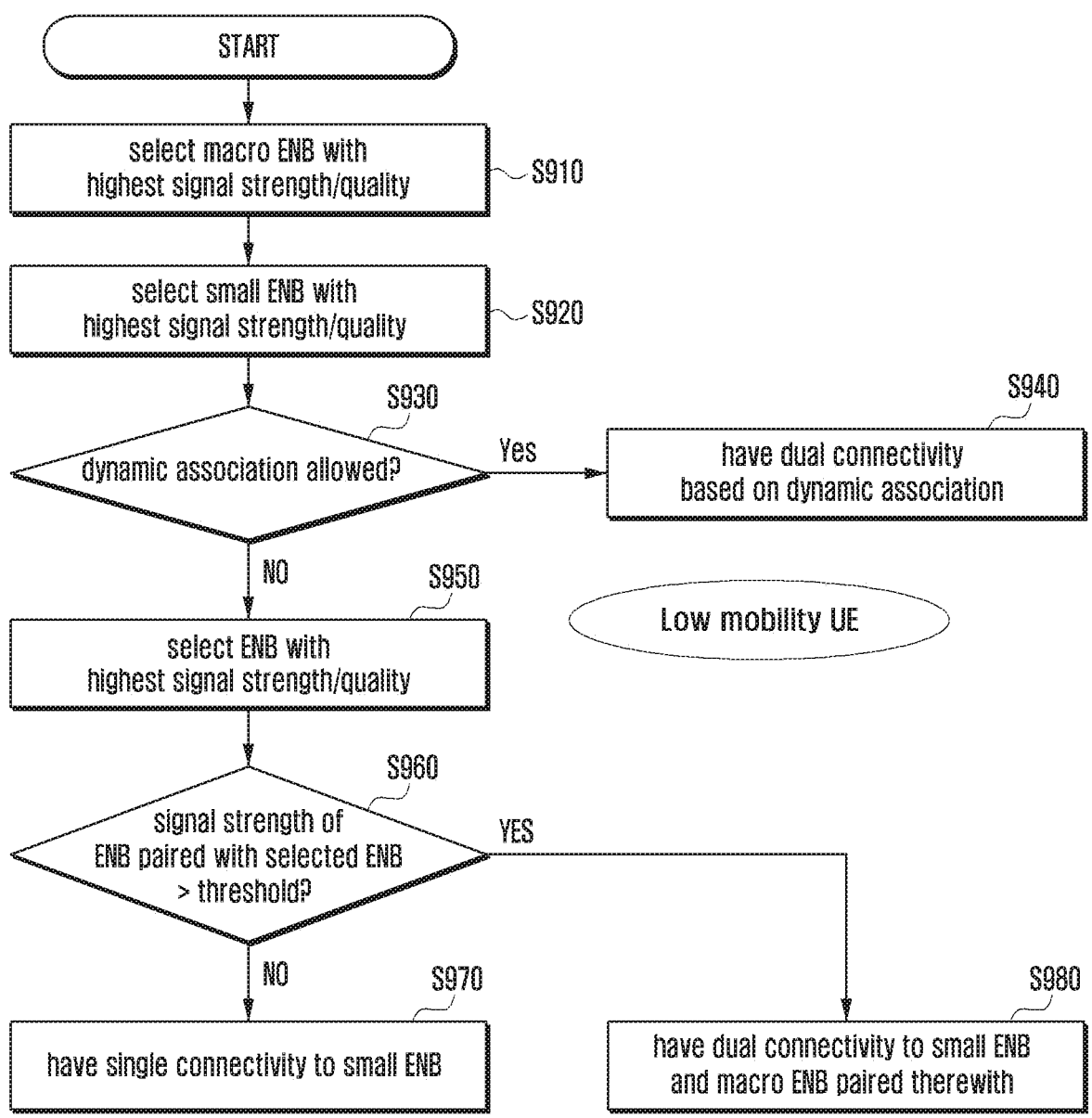
FIG. 9 is a flowchart of a procedure for the UE to determine a connection configuration according to another embodiment of the present invention.

This embodiment is described in FIG. 9.

FIG. 9 is a flowchart of a procedure for the UE to determine a connection configuration according to another embodiment of the present invention. More specifically, in FIG. 9, it is assumed that the UE is of low mobility.

At step S910, the UE selects a macro ENB with the highest signal strength/quality among neighboring macro ENBs. At step S920, the UE selects a small ENB with the highest signal strength/quality among neighboring small ENBs.

At step S930, the UE determines whether dynamic association is allowed.

If dynamic association is allowed, at step S940, the UE makes dual connections to the macro ENB selected at step S910 and the small ENB selected at step S920.

If dynamic association is not allowed, at step S950, the UE selects the small ENB selected at step S920. This is because the UE is of low mobility.

At step S960, the UE identifies the ENB paired with the selected ENB and checks whether the ENB paired with the selected ENB has a signal strength/quality higher than or equal to a preset threshold.

If the paired ENB has a signal strength/quality higher than or equal to the preset threshold, at step S980, the UE makes dual connections to the selected small ENB and the ENB paired therewith.

If the paired ENB has a signal strength/quality lower than or equal to the preset threshold, at step S970, the UE makes a single connection to the selected small ENB (small ENB with the highest signal strength/quality).

As described above, it is possible to force the UE to prefer a specific connection configuration by placing a limitation on the selectable best ENB according to mobility or offloading.

<b2> Triggering Handover in Dual Connectivity

Hereinabove, a description is given of a scheme for determining the connection configuration in dual connectivity.

After determining the connection configuration, when there is a need for changing the connection configuration, this is to be notified to the ENB in the form of a measurement report. In the case of single connectivity, when the UE discovers an ENB having a higher signal strength/quality than the serving ENB and this state is maintained for a preset time (time-to-trigger, TTT), the UE sends a measurement report to the serving ENB to thereby trigger handover.

However, in the case of dual connectivity, the scheme for measurement reporting may be varied according to the connection configuration selected by the UE as described below.

First, when the UE maintains the current connection configuration as a result of determining the connection configuration described above, there is no need to send a measurement report to the serving ENB. In this case, the UE does not send a measurement report to the serving ENB.

Second, when the UE determines to have single connectivity or to have dual connectivity based on dynamic association, the UE changes one of the links to the macro ENB and the small ENB. Hence, the UE sends the serving ENB a measurement report for the link to be changed.

That is, when the UE determines to make a connection to a new macro ENB, the UE sends the serving ENB results of measurement on frequency bands of the macro ENB. When the UE determines to make a connection to a new small ENB, the UE sends the serving ENB results of measurement on frequency bands of the small ENB.

Third, when the UE determines to have dual connectivity based on static association, the UE changes both of the links to the macro ENB and the small ENB. Hence, the UE sends the serving ENB results of measurement on the macro ENB and the small ENB.

Figure 10:
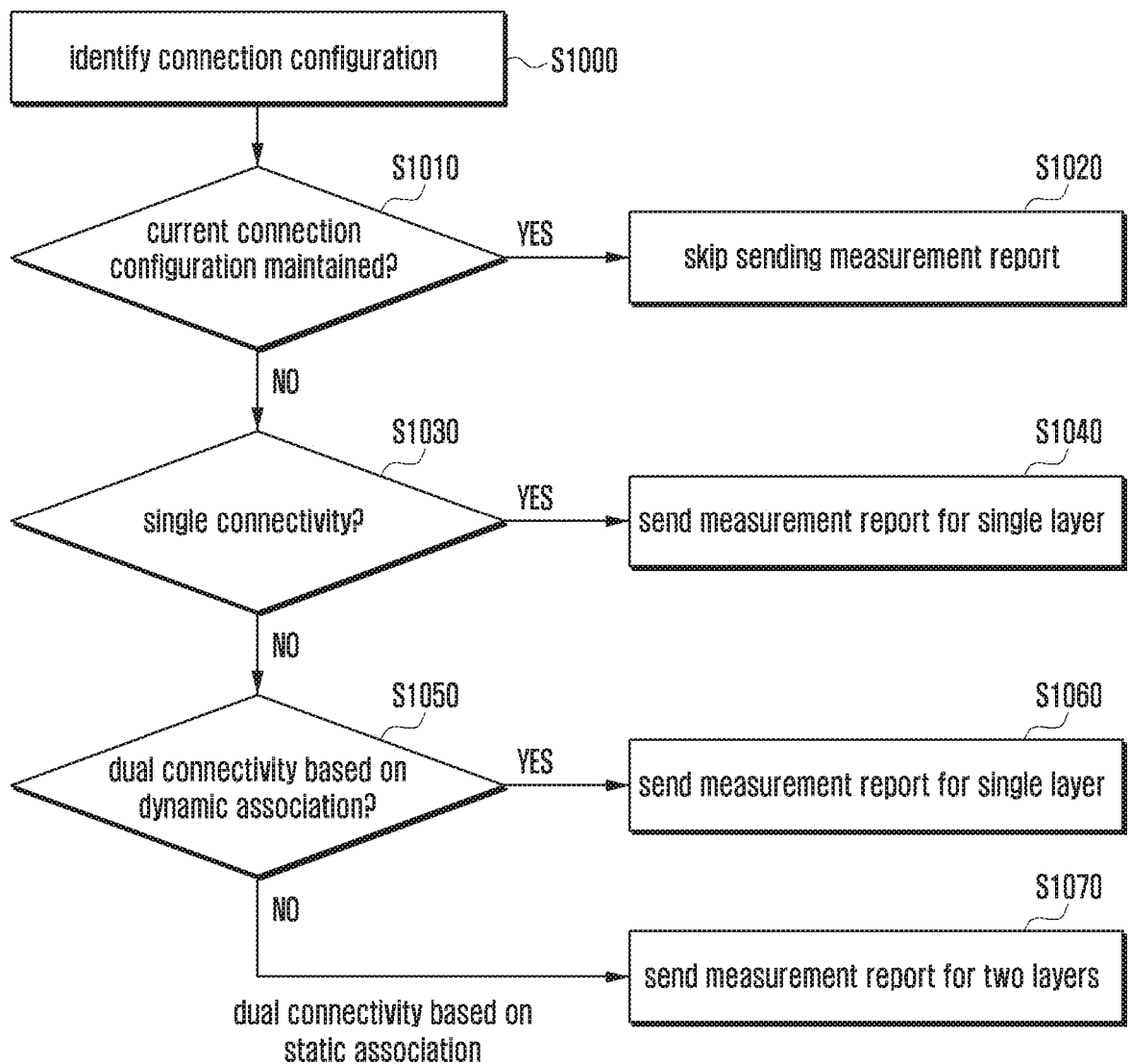
FIG. 10 is a flowchart of a procedure for the UE to perform measurement reporting according to an embodiment of the present invention.

The above scheme for measurement reporting based on the connection configuration is described in FIG. 10.

FIG. 10 is a flowchart of a procedure for the UE to perform measurement reporting according to an embodiment of the present invention.

Referring to FIG. 10, at step S1000, the UE identifies the connection configuration. Here, the connection configuration may indicate one of single connectivity, dual connectivity based on static association, and dual connectivity based on dynamic association.

At step S1010, the UE checks whether the current connection configuration is maintained. If the current connection configuration is maintained, at step S1020, the UE skips measurement reporting. That is, the UE does not send a measurement report to the serving ENB.

If the current connection configuration is not maintained, at step S1030, the UE checks whether the connection configuration indicates single connectivity. If the connection configuration indicates single connectivity, at step S1040, the UE sends the serving ENB a measurement report for a single layer. Here, the "layer" may denote a frequency or a frequency band.

Specifically, when the UE determines to have single connectivity, the UE changes one of the links to the macro ENB and the small ENB. Hence, the UE sends the serving ENB a measurement report only for the link to be changed.

If the connection configuration does not indicate single connectivity, at step S1050, the UE checks whether the connection configuration indicates dual connectivity based on dynamic association. If the connection configuration indicates dual connectivity based on dynamic association, at step S1060, the UE sends the serving ENB a measurement report for a single layer. Specifically, when the UE determines to have dual connectivity based on dynamic association, the UE changes one of the links to the macro ENB and the small ENB. Hence, the UE sends the serving ENB a measurement report only for the link to be changed.

If the connection configuration indicates dual connectivity based on static association, at step S1070, the UE sends the serving ENB results of measurement on the macro ENB and the small ENB.

Meanwhile, it is necessary to determine the point in time at which the UE sends a measurement report to the serving ENB. This is described with reference to FIG. 11.

Figure 11:
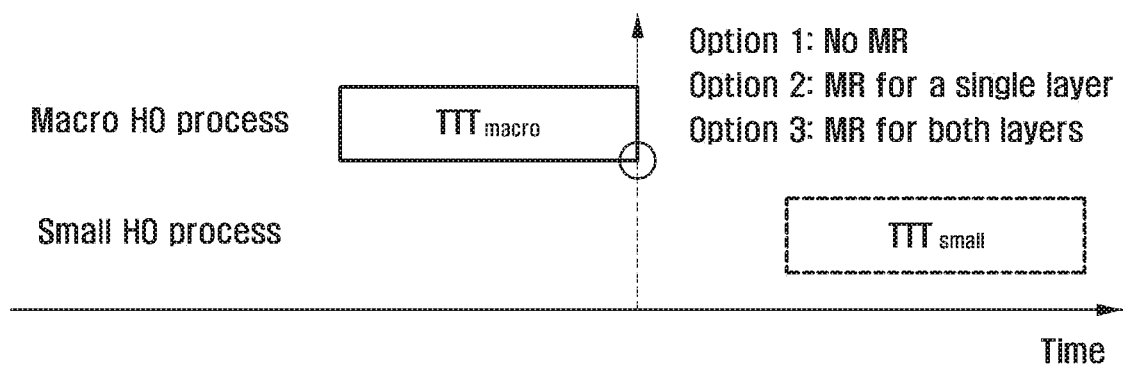
FIG. 11 illustrates the point in time to send a measurement report according to an embodiment of the present invention.

FIG. 11 illustrates the point in time to send a measurement report according to an embodiment of the present invention.

In the case of single connectivity, after measurement on the macro ENB layer (macro ENB frequency band), when the UE discovers a macro ENB having a higher signal strength/quality than the serving macro ENB and this state is maintained for the TTT (or first timer), the UE sends a measurement report for the macro ENB layer at the time of TTT expiration.

Likewise, after measurement on the small ENB layer (small ENB frequency band), when the UE discovers a small ENB having a higher signal strength/quality than the serving small ENB and this state is maintained for the TTT (or second timer), the UE sends a measurement report for the small ENB layer at the time of TTT expiration.

In the case of dual connectivity, at the time of TTT expiration for the macro ENB layer, according to the determined connection configuration, the UE may not send a measurement report (i), may send a measurement report for the macro ENB layer (ii), or may send a measurement report for the macro ENB layer and the small ENB layer (iii).

Likewise, at the time of TTT expiration for the small ENB layer, according to the determined connection configuration, the UE may not send a measurement report (i), may send a measurement report for the small ENB layer (ii), or may send a measurement report for the macro ENB layer and the small ENB layer (iii).

<b3> Information Provided for Proposed Scheme

In the present invention, whether a UE can have dual connectivity to a macro ENB and small ENB is determined on the basis of the cell pair. That is, when a macro ENB and a small ENB belonging to the same cell pair are interconnected through the backhaul and can exchange control information within a given delay bound, the UE may have dual connectivity to the macro ENB and the small ENB.

Hence, each of the macro ENB and the small ENB should notify the UE of the ENB paired therewith.

To this end, a macro ENB may broadcast the BS ID and physical cell ID (e.g. cell specific sequence, ID or information used for the cell-specific reference signal) of a small ENB pairable with the macro ENB. In one embodiment, a macro ENB may broadcast information on a small ENB by use of the neighbor cell list.

Similarly, a small ENB may broadcast the BS ID and physical cell ID of a macro ENB pairable with the small ENB.

Transmission of cell pair information for a macro ENB and small ENB is described with reference to FIG. 12.

Figure 12:
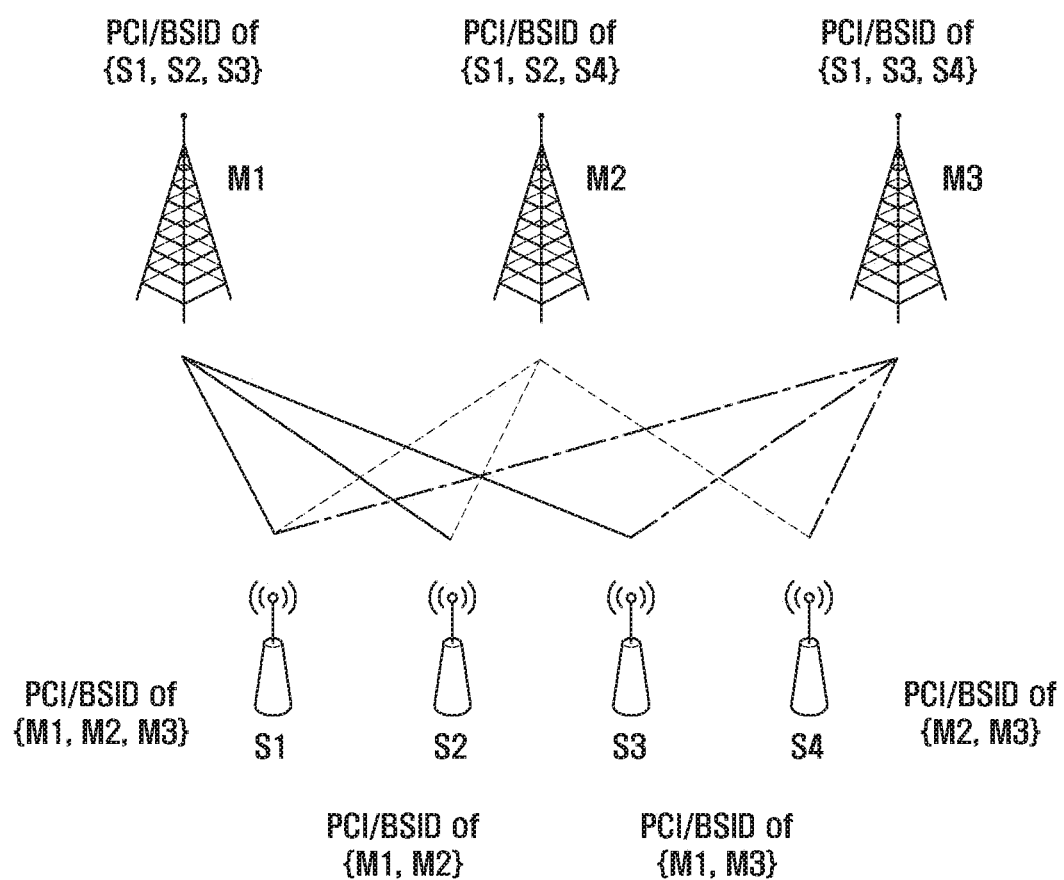
FIG. 12 illustrates transmission of cell pair information for macro and small ENBs according to an embodiment of the present invention.

FIG. 12 illustrates transmission of cell pair information for macro and small ENBs according to an embodiment of the present invention.

In FIG. 12, there are macro ENBs M1 to M3 and small ENBs S1 to S4 and ENBs that can form a cell pair are linked by lines. In this case, each ENB may transmit their cell pair information as follows.

Macro ENB 1 (M1): BS IDs and physical cell IDs of small ENBs S1, S2, S3
Macro ENB 2 (M2): BS IDs and physical cell IDs of small ENBs S1, S2, S4
Macro ENB 3 (M3): BS IDs and physical cell IDs of small ENBs S1, S3, S4
Small ENB 1 (S1): BS IDs and physical cell IDs of macro ENBs M1, M2, M3
Small ENB 2 (S2): BS IDs and physical cell IDs of macro ENBs M1, M2
Small ENB 3 (S3): BS IDs and physical cell IDs of macro ENBs M1, M3
Small ENB 4 (S4): BS IDs and physical cell IDs of macro ENBs M2, M3

Upon receiving cell pair information, the UE may identify a small ENB paired with a given macro ENB and a macro ENB paired with a given small ENB on the basis of the received cell pair information.

(c) Summary

Figure 13:
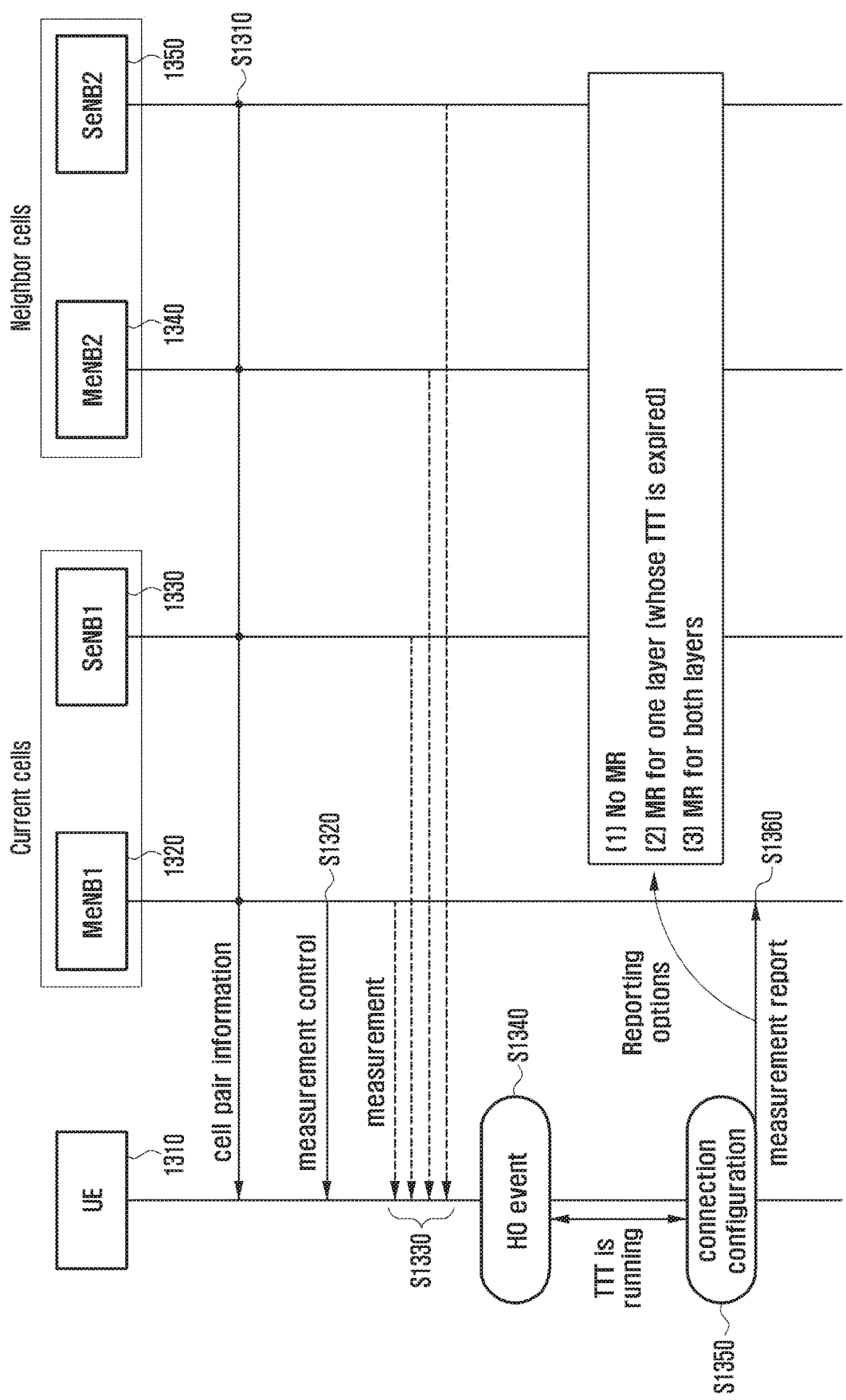
FIG. 13 is a sequence diagram of an overall procedure for the UE to determine a connection configuration and perform measurement reporting according to an embodiment of the present invention.

FIG. 13 is a sequence diagram of an overall procedure for the UE to determine a connection configuration and perform measurement reporting according to an embodiment of the present invention.

As described before, the present invention includes three constituents. The first is a scheme for determining the connection configuration in dual connectivity, the second is a scheme for triggering handover in dual connectivity through measurement reporting, and the third is a scheme for providing cell pair information for dual connectivity.

The overall procedure is described with reference to FIG. 13.

At step S1310, each macro ENB and each small ENB transmit their cell pair information (or cell association information). Each ENB may send their cell pair information to the UE 1310 through broadcasting (e.g. as system information), or higher or physical layer messaging. Cell pair information of each ENB may include information on heterogeneous ENBs pairable with the ENB.

At step S1320, the serving macro ENB 1320 sends measurement control information for measurement control to the UE 1310.

At step S1330, the UE 1310 performs measurement according to the measurement control information.

At step S1340, the UE 1310 detects occurrence of a handover event. After expiration of a preset time (e.g. TTT) from detection of the handover event, at step S1350, the UE 1310 determines the connection configuration. As described before, the UE may determine the connection configuration in consideration of at least one of signal quality, mobility (movement speed), and offloading.

Upon arrival of the measurement report time, at step S1360, the UE 1310 sends a measurement report to the serving macro ENB 1320 according to the determined connection configuration. As described before, according to the determined connection configuration, the UE 1310 may skip measurement reporting, send a measurement report for the single layer, or send a measurement report for the two layers.

In the above description, the UE determines the connection configuration. However, it does not necessarily mean that the UE has to determine the connection configuration. For example, the UE simply sends a measurement result to the serving ENB, and the ENB may determine the connection configuration in dual connectivity.

Next, a description is given of another embodiment in which the UE sends a measurement result to the serving ENB and the ENB determines the connection configuration in dual connectivity.

For a macro ENB, the condition to be satisfied for TTTmacro is given by Equation 1.

$$RSRP\text{target,macro} > RSRP\text{serving,macro} + \Delta \text{(both } RSRP \text{ and } RSRQ \text{ applicable)} \qquad \text{[Equation 1]}$$

In the case of existing single connectivity, when TTTmacro expires after continuous satisfaction of the condition, the UE sends a measurement report for the macro ENB frequency band to the serving ENB and the serving ENB initiates a procedure to handover the UE to the target macro ENB.

In the case of dual connectivity, as described before, the RRC function is provided by not the small ENB but the macro ENB, the handover procedure may differ from that for single connectivity.

That is, upon expiration of TTTmacro after continuous satisfaction of the condition, it may be necessary to handle not only handover for the macro ENB but also handover for the small ENB.

Hence, upon expiration of TTTmacro, it is necessary for the UE to send the serving ENB both a measurement report for the macro ENB frequency band and a measurement report for the small ENB frequency band, so that the serving ENB have information sufficient for handling UE handover.

In one embodiment, upon expiration of TTTmacro, the UE may send the serving ENB the measurement results for all small ENBs having been measured (option 1), or send the serving ENB the measurement results for those small ENBs satisfying a preset condition (option 2). Then, the serving ENB may determine the connection configuration for the UE on the basis of the received measurement results.

Here, the preset condition for a small ENB is satisfied when RSRPsmall>threshold is maintained for the minimum TTT. In this case, the minimum TTT may be set separately from TTTmacro or TTTsmall.

Figure 14:
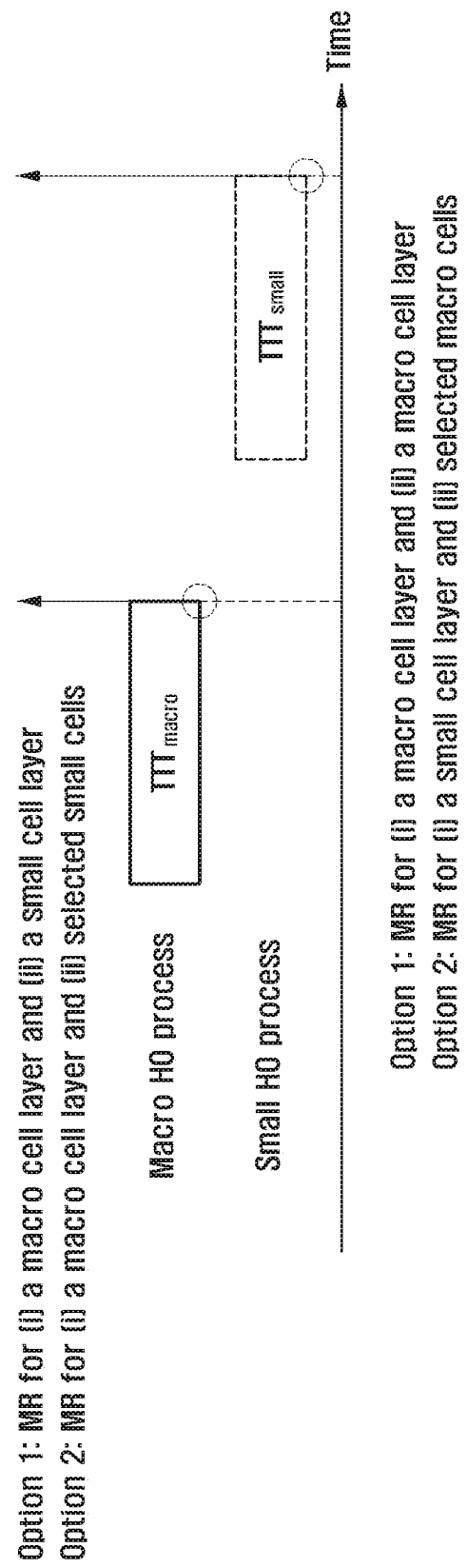
FIG. 14 illustrates the point in time for the UE to send a measurement report according to an embodiment of the present invention.

This is described below with reference to FIG. 14.

Option 1: RSRPtarget,macro>RSRPserving,macro+Δ

After continuous satisfaction of the above condition during TTTmacro, the UE sends the serving ENB a measurement report including measurement results for macro and small ENBs having been measured.

Then, the serving ENB determines the connection configuration for the UE and the UE may initiate handover according to the determination.

Option 2: RSRPtarget,macro>RSRPserving,macro+Δ

After continuous satisfaction of the above condition during TTTmacro, the UE sends the serving ENB a measurement report including measurement results for macro ENBs having been measured and small ENBs satisfying the condition "RSRPsmall>threshold" for TTTminimum.

Then, the serving ENB determines the connection configuration for the UE and the UE may initiate handover according to the determination.

Next, for a small ENB, the condition to be satisfied for TTTsmall is given by Equation 2.

$$RSRP\text{target,small} > RSRP\text{serving,small} + \Delta \qquad \text{[Equation 2]}$$

The above statement may also be applied to the small ENB case. This can be summarized as follows.

Option 1: RSRPtarget,small>RSRPserving,small+Δ

After continuous satisfaction of the above condition during TTTsmall, the UE sends the serving ENB a measurement report including measurement results for macro and small ENBs having been measured.

Then, the serving ENB determines the connection configuration for the UE and the UE may initiate handover according to the determination.

Option 2: RSRPtarget,small>RSRPserving,small+Δ

After continuous satisfaction of the above condition during TTTsmall, the UE sends the serving ENB a measurement report including measurement results for small ENBs having been measured and macro ENBs satisfying the condition "RSRPmacro>threshold" for TTTminimum.

Then, the serving ENB determines the connection configuration for the UE and the UE may initiate handover according to the determination.

Figure 15:
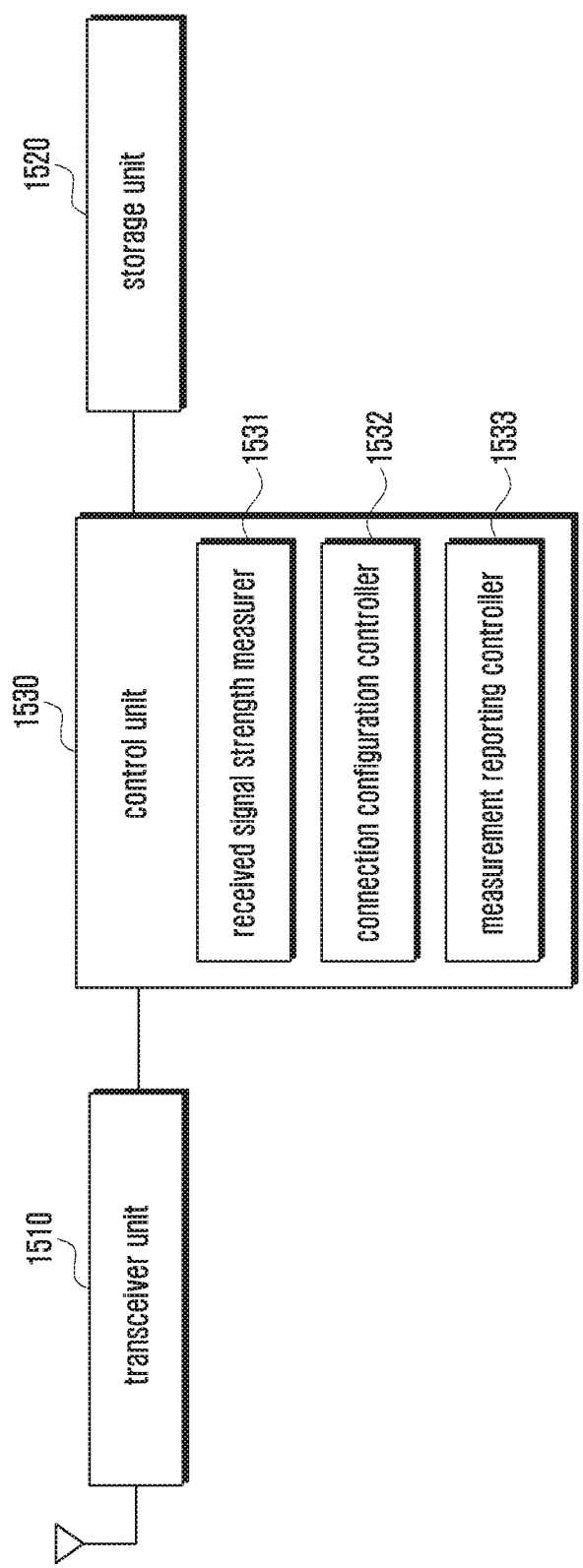
FIG. 15 is a block diagram of a user equipment according to an embodiment of the present invention.

FIG. 15 is a block diagram of a user equipment according to an embodiment of the present invention. As shown in FIG. 15, the UE may include a transceiver unit 1510, a storage unit 1520, and a control unit 1530.

The transceiver unit 1510 performs wireless data transmission and reception operations for the UE. The transceiver unit 1510 may include a radio frequency (RF) transmitter for upconverting the frequency of a signal to be transmitted and amplifying the signal, and an RF receiver for low-noise amplifying a received signal and downconverting the frequency of the received signal. The transceiver unit 1510 may forward data received through a wireless channel to the control unit 1530, and transmit data output from the control unit 1530 through the wireless channel. In particular, the transceiver unit 1510 may receive cell pair information from a macro ENB or small ENB. The transceiver unit 1510 may send the serving ENB a measurement report containing measurement results for the serving and neighbor cells.

The storage unit 1520 may store programs and data needed for operation of the UE. The storage unit 1520 may be divided into a program region and a data region.

The control unit 1530 may control signal flows between components of the UE so that the UE can operate according to embodiments of the present invention. Specifically, the control unit 1530 may control a series of operations to determine the connection configuration according to at least one of received signal strengths of ENBs, mobility of the UE, and necessity of offloading. To this end, the control unit 1530 may include a received signal strength measurer 1531, a connection configuration controller 1532, and a measurement reporting controller 1533.

The received signal strength measurer 1531 may measure signal strengths or signal qualities of signals received from multiple ENBs including serving ENBs and neighbor ENBs. Here, the ENB may be a macro ENB or small ENB.

The connection configuration controller 1532 may select a macro ENB with the highest signal strength and a small ENB with the highest signal strength. The connection configuration controller 1532 may check whether dynamic association is allowed for dual connectivity, and determine the connection configuration for the UE on the basis of the selected ENBs and checking result.

For example, when dynamic association is allowed, the connection configuration controller 1532 may control the UE to have dual connectivity to the macro ENB and small ENB with the highest signal strength.

When dynamic association is not allowed, the connection configuration controller 1532 may select the ENB with the highest signal strength and checks whether the ENB paired with the selected ENB has a signal strength higher than or equal to a preset threshold. When the ENB paired with the selected ENB has a signal strength higher than or equal to the preset threshold, the connection configuration controller 1532 may control the UE to have dual connectivity to the ENB having the highest signal strength and the ENB paired therewith.

When the ENB paired with the selected ENB has a signal strength lower than the preset threshold, the connection configuration controller 1532 may control the UE to have single connectivity to the ENB having the highest signal strength.

In one embodiment, the connection configuration controller 1532 may determine the connection configuration according to at least one of received signal strength, UE mobility, and necessity of offloading. For example, when the UE has high mobility (i.e. moves at a speed higher than a threshold), the connection configuration controller 1532 may control the UE to make a connection to the macro ENB first. When traffic offloading is necessary, the connection configuration controller 1532 may control the UE to make a connection to the small ENB first.

The measurement reporting controller 1533 may control a series of operations to send a measurement report to the serving ENB on the basis of the connection configuration determined by the connection configuration controller 1532. For example, when the current connection configuration is maintained, the measurement reporting controller 1533 may skip sending a measurement report. When the connection configuration indicates single connectivity or dual connectivity based on dynamic association, the measurement reporting controller 1533 may control the UE to send a measurement report containing measurement information of a single frequency band. When the connection configuration indicates dual connectivity based on static association, the measurement reporting controller 1533 may control the UE to send a measurement report containing measurement information of multiple frequency bands.

In addition, when the timer for the macro ENB or small ENB expires, the measurement reporting controller 1533 may control the UE to send a measurement report containing measurement information of at least one frequency band associated with the macro ENB or small ENB.

In FIG. 15, the control unit 1530 is depicted as having separate internal blocks with different functions. However, the present invention is not limited thereto or thereby. For example, the function of the connection configuration controller 1532 may be performed by the control unit 1530 itself.

Figure 16:
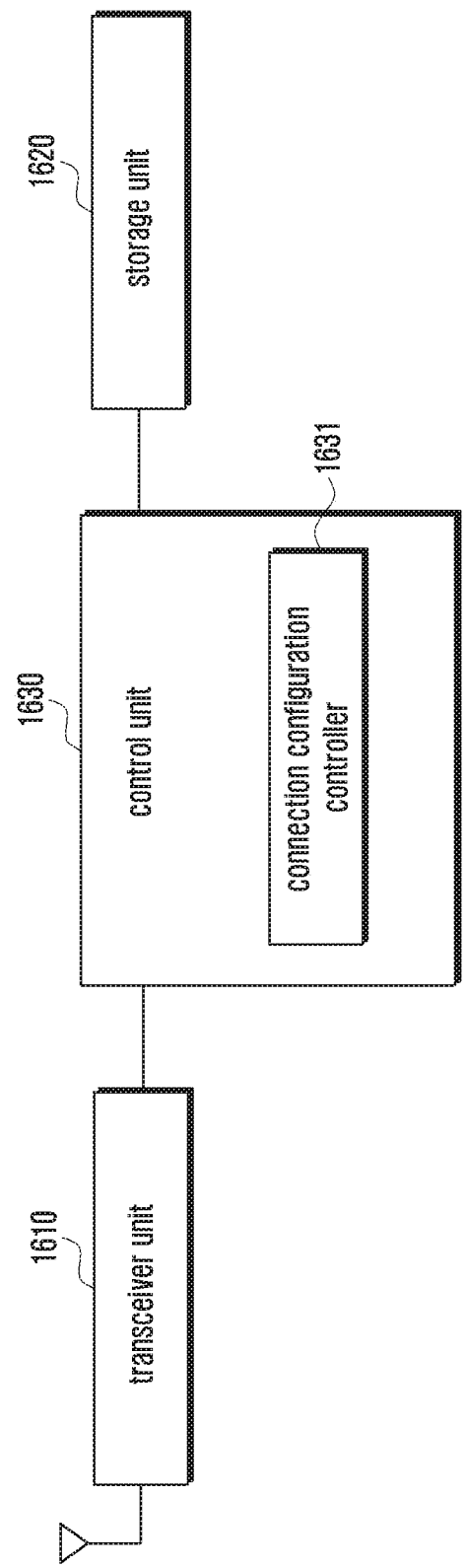
FIG. 16 is a block diagram of a base station according to an embodiment of the present invention.

FIG. 16 is a block diagram of a base station according to an embodiment of the present invention. As shown in FIG. 16, the ENB may include a transceiver unit 1610, a storage unit 1620, and a control unit 1630.

The transceiver unit 1610 performs wireless data transmission and reception operations for the ENB. The transceiver unit 1610 may include an RF transmitter for upconverting the frequency of a signal to be transmitted and amplifying the signal, and an RF receiver for low-noise amplifying a received signal and downconverting the frequency of the received signal. The transceiver unit 1610 may forward data received through a wired or wireless channel to the control unit 1630, and transmit data output from the control unit 1630 through a wireless channel. In particular, the transceiver unit 1610 may send a UE cell pair information including information on heterogeneous ENBs pairable with the ENB.

The storage unit 1620 may store programs and data needed for operation of the ENB. The storage unit 1620 may be divided into a program region and a data region.

The control unit 1630 may control signal flows between components of the ENB so that the ENB can operate according to embodiments of the present invention. Specifically, the control unit 1630 may control a series of operations to send cell pair information to the UE. The control unit 1630 may also control a series of operations to determine the connection configuration for the UE on the basis of measurement results for macro ENBs or small ENBs received from the UE. To this end, the control unit 1630 may include a connection configuration controller 1631.

The connection configuration controller 1631 may determine the connection configuration for the UE on the basis of measurement results for macro ENBs and small ENBs measured by and received from the UE. The measurement results may be received from the UE when the timer for the macro ENB or small ENB expires. In determining the connection configuration for the UE, the connection configuration controller 1631 of the ENB corresponds to the connection configuration controller 1532 of the UE, and a detailed description thereof is omitted.

The connection configuration controller 1631 may control the ENB to send information on the determined connection configuration to the UE. Then, the UE may perform handover according to the information on the connection configuration.

According to various embodiments of the present invention, it is possible to make best use of dual connectivity while minimizing switching between single connectivity mode and dual connectivity mode. Consequently, the user equipment may remain in dual connectivity mode for an extended time.

Hereinabove, various embodiments of the present invention have been shown and described for the purpose of illustration without limiting the subject matter of the present invention. It should be understood by those skilled in the art that many variations and modifications of the method and apparatus described herein will still fall within the spirit and scope of the present invention as defined in the appended claims and their equivalents.

The invention claimed is:

1. A method of setting a connection configuration for a user equipment (UE) in a wireless communication system supporting dual connectivity, the method comprising:
   detecting occurrence of a handover event;
   selecting a macro base station (macro eNB) with a highest signal strength among neighboring macro eNBs and a small base station (small eNB) with a highest signal strength among neighboring small eNBs;
   checking whether the UE is allowed to perform dynamic association, wherein the dynamic association indicates that the UE is allowed to connect with the macro eNB and the small eNB belonging to different cell pairs respectively;
   determining the connection configuration for the UE based on the selected eNBs and checking result, wherein the connection configuration indicates a single connectivity, dual connectivity based on static association, or dual connectivity based on the dynamic association, and wherein the static association indicates that the UE is not allowed to connect with the macro eNB and the small eNB belonging to different cell pairs respectively; and
   transmitting a measurement report corresponding to the determined connection configuration.

2. The method of claim 1, wherein determining the connection configuration further comprises:
   causing, when the UE is allowed to connect with the macro eNB and the small eNB belonging to the different cell pairs respectively, the UE to have dual connectivity to the macro eNB with the highest signal strength and the small eNB with the highest signal strength.

3. The method of claim 1, wherein determining the connection configuration further comprises, when the UE is not allowed to connect with the macro eNB and the small eNB belonging to the different cell pairs respectively:
   selecting an eNB with the highest signal strength;
   checking whether an eNB paired with the selected eNB has a signal strength higher than or equal to a preset threshold;
   causing, when the paired eNB has the signal strength higher than or equal to the threshold, the UE to have dual connectivity to the eNB with the highest signal strength and the eNB paired therewith; and
   causing, when the paired eNB has a signal strength lower than the threshold, the UE to have single connectivity to the eNB with the highest signal strength.

4. The method of claim 1,
   wherein determining the connection configuration comprises determining the connection configuration for the UE based on mobility of the UE and necessity of traffic offloading,
   wherein determining the connection configuration comprises causing the UE to make a connection to a macro eNB first when the UE is of high mobility, and
   wherein determining the connection configuration comprises causing the UE to make a connection to a small eNB first when traffic offloading is necessary.

5. The method of claim 1, further comprising receiving cell pair information from a macro eNB or a small eNB,
   wherein the cell pair information from the macro eNB comprises information on small eNBs pairable with the macro eNB, and
   wherein the cell pair information from the small eNB comprises information on macro eNBs pairable with the small eNB.

6. The method of claim 1,
   wherein transmitting the measurement report is skipped when the current connection configuration is maintained,
   wherein transmitting the measurement report comprises transmitting the measurement report containing measurement information for a single frequency band when the connection configuration indicates the single connectivity or the dual connectivity based on the dynamic association, wherein transmitting the measurement report comprises transmitting the measurement report containing measurement information for multiple frequency bands when the connection configuration indicates the dual connectivity based on the static association, and wherein transmitting the measurement report comprises transmitting the measurement report containing measurement information for at least one frequency band associated with the macro eNB or the small eNB at the time when the timer for the macro eNB or small eNB expires.

7. A user equipment (UE) capable of setting a connection configuration in a wireless communication system supporting dual connectivity, the UE comprising:

a transceiver; and a controller coupled with the transceiver, the controller including a connection configuration controller and a measurement reporting controller, wherein the connection configuration controller is configured to:

select, upon detecting a handover event, a macro base station (eNB) with a highest signal strength and a small eNB with a highest signal strength, check whether the UE is allowed to perform dynamic association, wherein the dynamic association indicates that the UE is allowed to connect with the macro eNB and the small eNB belonging to different cell pairs respectively, and determine the connection configuration for the UE based on the selected eNBs and checking result, wherein the connection configuration indicates a single connectivity, dual connectivity based on static association, or dual connectivity based on the dynamic association, and wherein the static association indicates that the UE is not allowed to connect with the macro eNB and the small eNB belonging to different cell pairs respectively, and wherein the measurement reporting controller is configured to transmit a measurement report corresponding to the determined connection configuration.

8. The UE of claim 7, wherein, when the UE is allowed to connect with the macro eNB and the small eNB belonging to the different cell pairs respectively, the connection configuration controller controls a process of having dual connectivity to the macro eNB with the highest signal strength and the small eNB with the highest signal strength.

9. The UE of claim 7, wherein, when the UE is not allowed to connect with the macro eNB and the small eNB belonging to the different cell pairs respectively, the connection configuration controller controls a process of selecting an eNB with the highest signal strength, checking whether an eNB paired with the selected eNB has a signal strength higher than or equal to a preset threshold, having, when the paired eNB has the signal strength higher than or equal to the threshold, dual connectivity to the eNB with the highest signal strength and the eNB paired therewith, and having, when the paired eNB has a signal strength lower than the threshold, single connectivity to the eNB with the highest signal strength.

10. The UE of claim 7, wherein the connection configuration controller determines the connection configuration for the UE based on mobility of the UE and necessity of traffic offloading, wherein the connection configuration controller makes a connection to a macro eNB first when the UE is of high mobility, and wherein the connection configuration controller makes a connection to a small eNB first when traffic offloading is necessary.

11. The UE of claim 7, wherein the controller controls the transceiver to receive cell pair information from the macro eNB or the small eNB, wherein the cell pair information comprises information on small eNBs pairable with the macro eNB and information on macro eNBs pairable with the small eNB, wherein the measurement reporting controller controls skipping of sending the measurement report when the current connection configuration is maintained, wherein the measurement reporting controller controls transmitting the measurement report containing measurement information for the single frequency band when the connection configuration indicates the single connectivity or the dual connectivity based on the dynamic association, wherein the measurement reporting controller controls transmitting the measurement report containing measurement information for multiple frequency bands when the connection configuration indicates the dual connectivity based on the static association, and wherein the measurement reporting controller controls transmitting the measurement report containing measurement information for at least one frequency band associated with the macro eNB or the small eNB at a time when the timer for the macro eNB or small eNB expires.

* * * * *